United States Patent [19]
Rush et al.

[11] Patent Number: 5,606,730
[45] Date of Patent: Feb. 25, 1997

[54] ELECTRONIC DEVICE HAVING AN ELECTRONIC COUPLER FOR COUPLING BETWEEN TWO ELECTRONIC COMPONENTS AND METHOD OF ASSEMBLING SAME

[75] Inventors: Tonya A. Rush, Barrington; Glenn C. Goergen, Lake Zurich; Mike M. Albert, Chicago, all of Ill.

[73] Assignee: Motorola, Inc., Schaumburg, Ill.

[21] Appl. No.: 603,027

[22] Filed: Feb. 16, 1996

Related U.S. Application Data

[63] Continuation of Ser. No. 148,710, Nov. 8, 1993, abandoned.

[51] Int. Cl.$^6$ .............................. H04B 1/03; H04B 1/38
[52] U.S. Cl. ........................ 455/90; 455/351; 379/433; 361/814; 439/31
[58] Field of Search ........................ 455/89, 90, 128, 455/280, 347, 348, 349, 351, 129; 439/11, 15, 31, 67, 928; 343/702, 882; 361/785, 814, 681, 683; 364/708.1; 16/223; 379/433

[56] References Cited

U.S. PATENT DOCUMENTS

| | | | |
|---|---|---|---|
| 4,825,395 | 4/1989 | Kinser, Jr. et al. | 364/708.1 |
| 4,842,531 | 6/1989 | Takemura | 364/708.1 |
| 4,845,772 | 7/1989 | Metroka et al. | 455/90 |
| 4,897,873 | 1/1990 | Beutler et al. | 379/433 |
| 4,959,887 | 10/1990 | Gruenberg et al. | 16/223 |
| 4,961,126 | 10/1990 | Suzuki | 439/31 |
| 5,001,659 | 3/1991 | Watabe | 364/708.1 |
| 5,014,346 | 5/1991 | Phillips et al. | 455/89 |
| 5,027,394 | 6/1991 | Ono et al. | 379/433 |
| 5,170,173 | 12/1992 | Krenz et al. | 343/702 |
| 5,259,019 | 11/1993 | Stilley | 379/433 |

FOREIGN PATENT DOCUMENTS

| | | | |
|---|---|---|---|
| 9217974 | 10/1992 | WIPO | 379/433 |
| 9220181 | 11/1992 | WIPO | 379/433 |
| 9318592 | 9/1993 | WIPO | 455/90 |

*Primary Examiner*—Andrew Faile
*Attorney, Agent, or Firm*—Rolland R. Hackbart

[57] ABSTRACT

An electronic device coupling apparatus is used to couple two electronic devices through a hinge. A first electronic device (221) is disposed within the main housing of a radiotelephone (101). The second electronic device (301) is disposed within a movable element (103) of the radiotelephone (101). The coupling apparatus uses a piece of flex (215) which is torsionally twisted upon the opening of the movable element (103) of the radiotelephone (101). Additionally, the flex (215) is coupled to the electronic devices (221, 301) using an elastomeric connector (217).

13 Claims, 5 Drawing Sheets

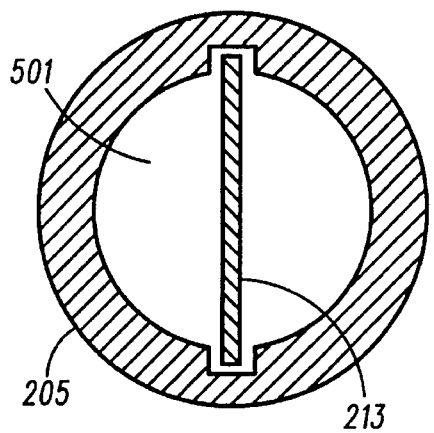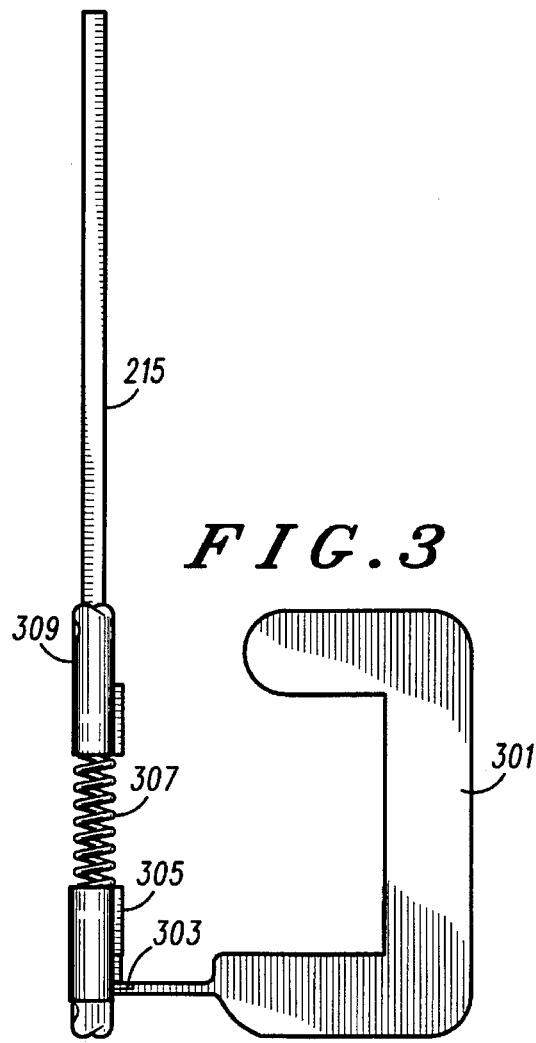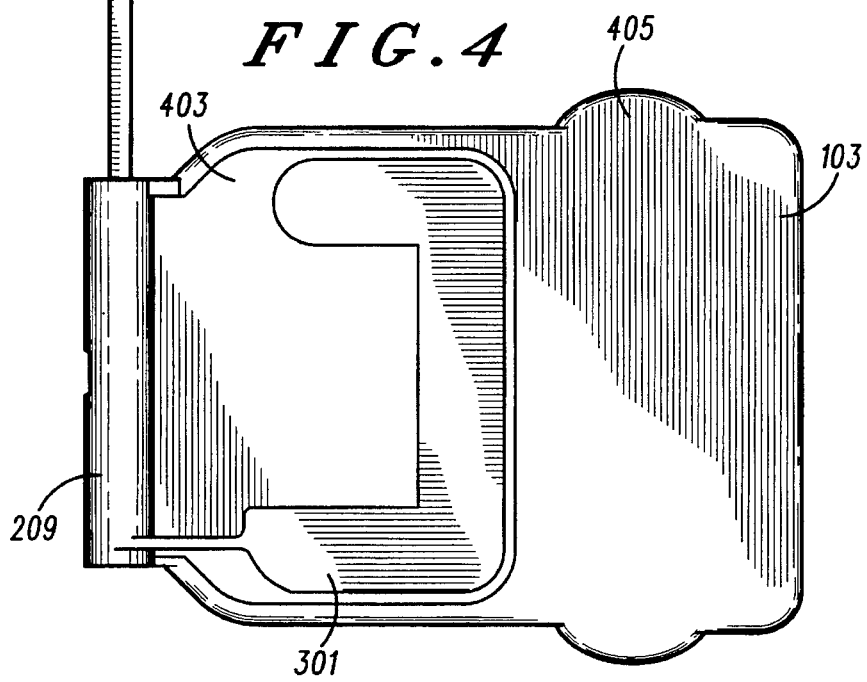

POINT 2
POINT 1

λ
209
215 215

FIG. 6C
FIG. 6D
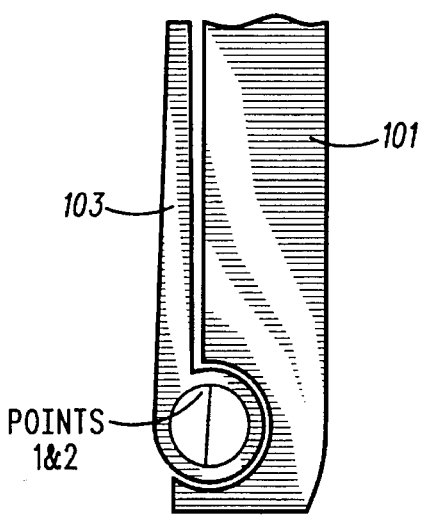
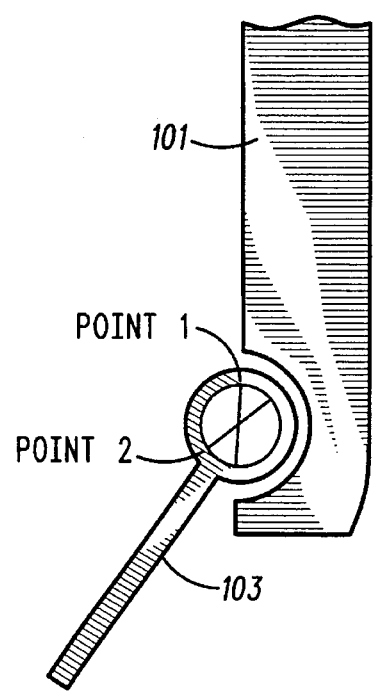
FIG. 6E
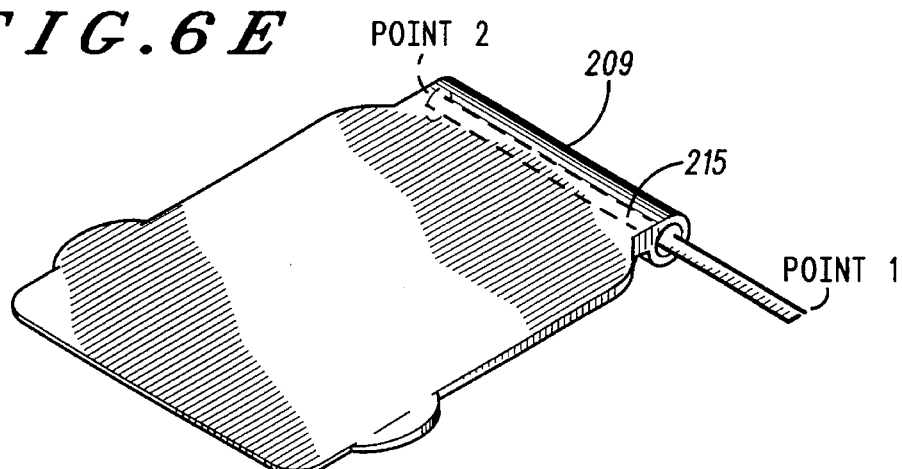
FIG. 6F
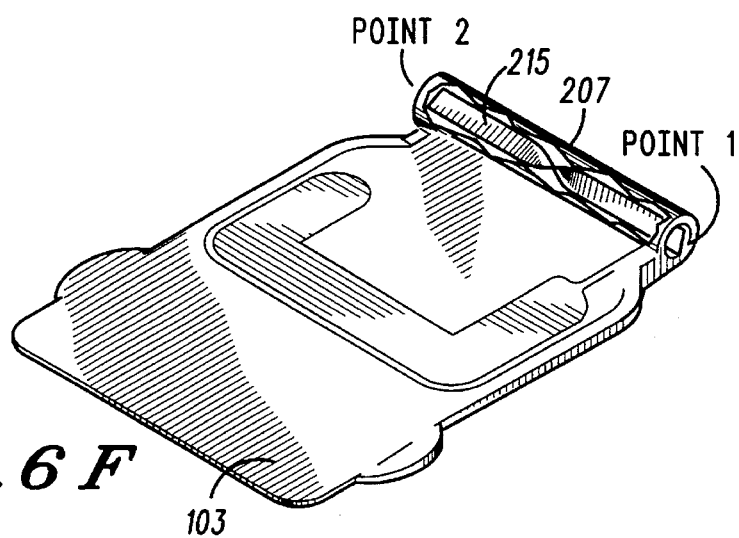

5,606,730

ELECTRONIC DEVICE HAVING AN ELECTRONIC COUPLER FOR COUPLING BETWEEN TWO ELECTRONIC COMPONENTS AND METHOD OF ASSEMBLING SAME

This is a continuation of application Ser. No. 08/1488,710, filed Nov. 8, 1993 and now abandoned.

FIELD OF THE INVENTION

This invention generally relates to coupling two electronic components using a flex circuit, and more specifically, to electrically coupling a first electronic component in a main housing to a second electronic component disposed within a movable element of the electronic device using flex circuits.

BACKGROUND OF THE INVENTION

Generally, portable radiotelephones send and receive radio frequency (RF) signals to and from a remote transceiver, commonly known as a radio communication link. This radio communication link allows a portable radiotelephone user to communicate with other people using other portable radiotelephones or land-line telephone equipment. Often, in order to improve the quality of the communication link, a portable radiotelephone employs diversity antennas. Diversity antennas allow a portable radiotelephone to receive the RF signals transmitted from the remote transceiver along two individual paths. Then, the portable radiotelephone may choose either the first path or the second path or a combination thereof in order to improve the communication link between the remote transceiver and the portable radiotelephone.

Today, as portable radiotelephones decrease in size and weight, it becomes increasingly difficult to employ two independent receiving antennas in a portable communication device which would offer an improvement in a communication link. In portable radiotelephones, which include a movable element, or a flap, it would be advantageous to put the second antenna in the flap. Since the flap is hinged to the main housing, it is technically challenging to electrically couple the antenna in the flap to the other electrical components contained within the main housing of the radiotelephone. In the past, the antenna in the flap has been capacitively or inductively coupled to the electronics contained within the main housing. One such example can be found in U.S. Pat. No. 5,014,346. Although this method was successful, it would be advantageous to make a direct electrical connection between the antenna in the flap and the electronics enclosed within the main housing. A direct connection would provide a reduction in the complexity of the connection as well as improved performance of the antenna.

BRIEF DESCRIPTION OF THE DRAWINGS

FIG. 3 is an illustration of an antenna and some mechanical components of a hinge in accordance with the present invention.

FIG. 4 is an illustration of the antenna of FIG. 3 inserted into the flap of the radiotelephone illustrated in FIG. 1.

FIG. 5 is an illustration of a side view of a knuckle of the portable radiotelephone illustrated in FIG. 2.

DESCRIPTION OF A PREFERRED EMBODIMENT

Figures 1A, 1B:
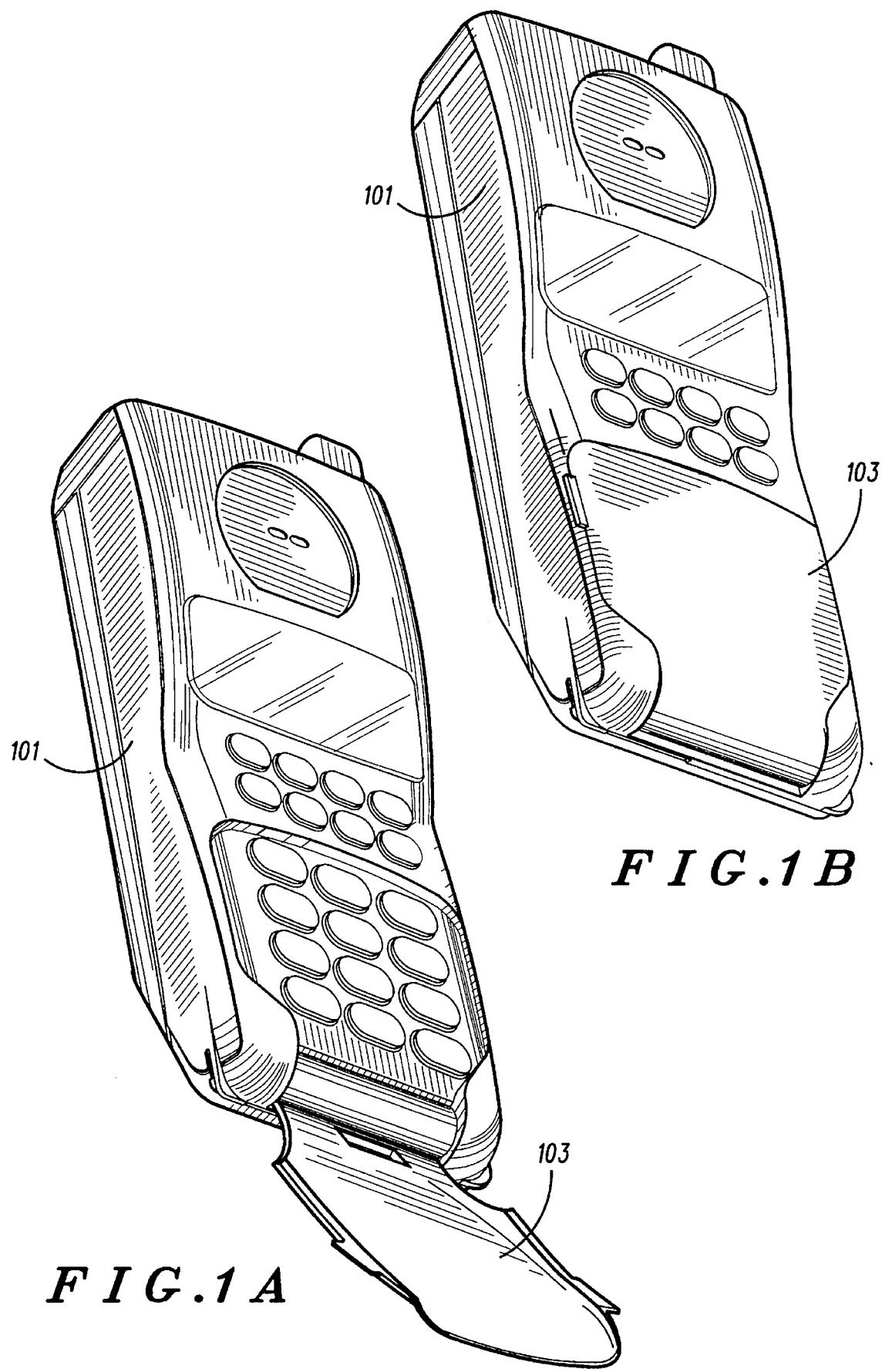
FIG. 1 is a two part illustration of a portable radiotelephone in accordance with the present invention.

FIG. 1 is a two part illustration of a portable radiotelephone 101. The portable radiotelephone 101 includes diversity antennas, one of which is contained in the movable element or flap 103 of the portable radiotelephone 101. FIG. 1A illustrates the radiotelephone 101 with its flap 103 in an opened position. FIG. 1B illustrates the radiotelephone 101 with its flap 103 in a closed position.

Figure 2:
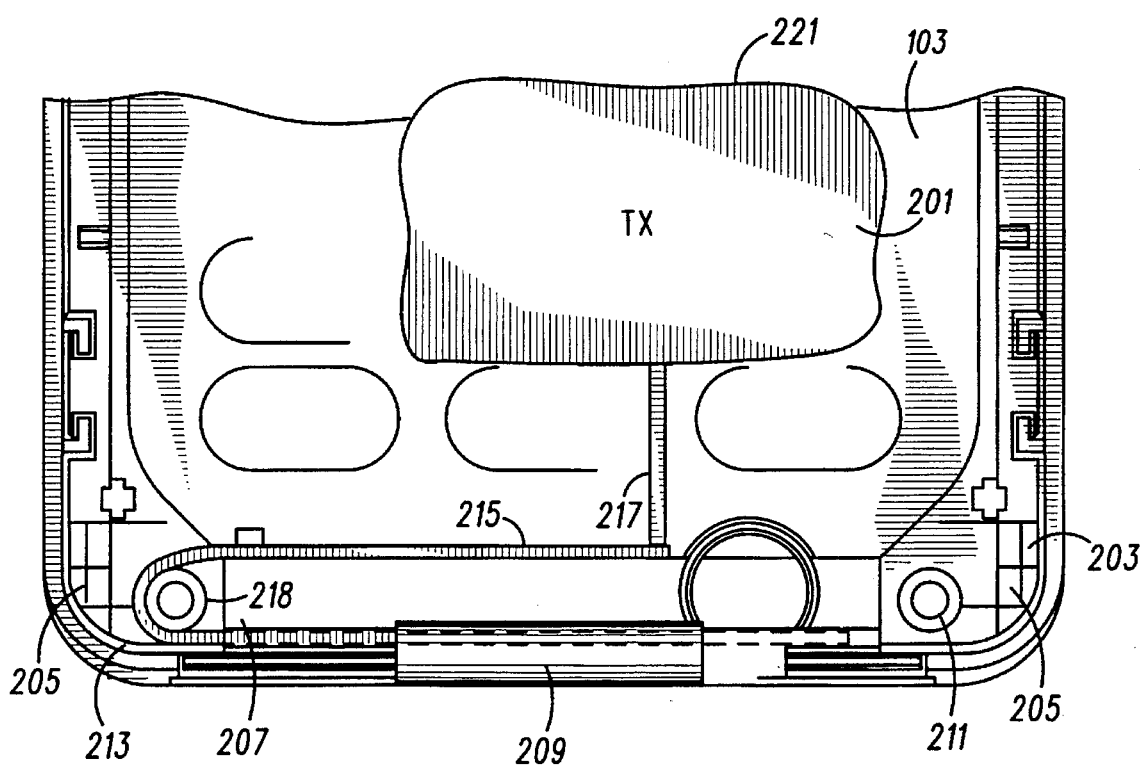
FIG. 2 is an illustration of a portion of the radiotelephone of FIG. 1 in accordance with the present invention.

FIG. 2 is an illustration of a portion of the radiotelephone 101 illustrated in FIG. 1. Specifically, FIG. 2 is an illustration of the rear of the radiotelephone 101 of FIG. 1 with its rear housing removed. This view illustrates the interaction of the coupling apparatus with other components within the radiotelephone 101. A front housing 203 of the portable radiotelephone contains a knuckle area 205. The knuckle area 205 is a hollowed out area for receiving the hinge 207 of the flap 103. The knuckle of the flap 209 is hollow and contains other hinge elements of the flap. Upon insertion of the flap 103 onto the radiotelephone 101, the knuckle of the flap 209 is aligned with the two knuckles of the front housing of the radiotelephone. The front housing of the radiotelephone 203 also contains two pins 211, 213. Pins 211, 213 are used for a cam follower as shafts. FIG. 2 also illustrates a flex 215 running from inside the flap knuckle 209 into the front housing knuckle 205, past to one side of pin 213, around boss 218 and into the main housing of the radiotelephone 101. When the flex 215 is inside the main housing of the radiotelephone, it is connected to the other electronic components using an elastomeric connector 217, such as a fuzz pin or a zebra connector. Additionally, the connection can be made using any other equally sufficient means including soldering.

FIG. 3 is an illustration of an antenna 301. Antenna 301 will be used as the diversity antenna for the portable radiotelephone 101 of FIG. 1. One end of the antenna 301 is coupled to the flex 215. In the preferred embodiment, the antenna 301 is made from flex, thus, the flex 215 is a continuation of the antenna 301. It is anticipated that other antennas and electrical components could be attached to the flex 215. The coupling of the flex 215 to these other components would be done in a manner similar to that done for flex connection inside the radiotelephone 101. The free end of the flex 215 is inserted through a slot 303 in the first shaft 305. The flex 215 is then fed through a spring 307 and a second shaft 309. In the preferred embodiment, the second shaft 309 and the spring 307 are already inserted into the flap knuckle 209 of FIG. 2 for ease of assembly.

FIG. 4 is an illustration of the flap 103 of FIG. 1 with the antenna 301 of FIG. 3 assembled within the flap 103. In the preferred embodiment, the antenna 301 is placed in a depression 403 of the flap 103. This depression 403 allows the antenna 301 to be sub-flush with the top surface 405 of the flap 103. In the preferred embodiment, a label sets over the antenna 301, the label being flush with the top surface 405 for aesthetic purposes. Additionally, FIG. 4 illustrates the hinge assembly of FIG. 3, including the first shaft 305, the spring 307 and the second shaft 309 fully inserted into the flex knuckle 209. The hinge assembly is inserted into the flap knuckle 209 with the flex 215 sticking out of the first end of the flap knuckle 209.

FIG. 5 is an illustration of a side view of the front housing knuckle 205. The front housing knuckle 205 contains the pin 213. Upon assembly of the flap 103 to the front housing 203, the first end of the flex 215 of FIG. 2 is inserted into the front housing knuckle 205. The flex will insert to one side of pin 213 and must be maneuvered back around the boss 218 of FIG. 2 (not shown in FIG. 5) and come back out into the front housing of the radiotelephone 203. This is more clearly illustrated in FIG. 2. Once the flex 215 is fed through the front housing knuckle 205, the two shafts 305, 309 of FIG. 3 may be pinched together such that the flap knuckle 209 may be mated with the front housing knuckles 205.

Figure 6A:
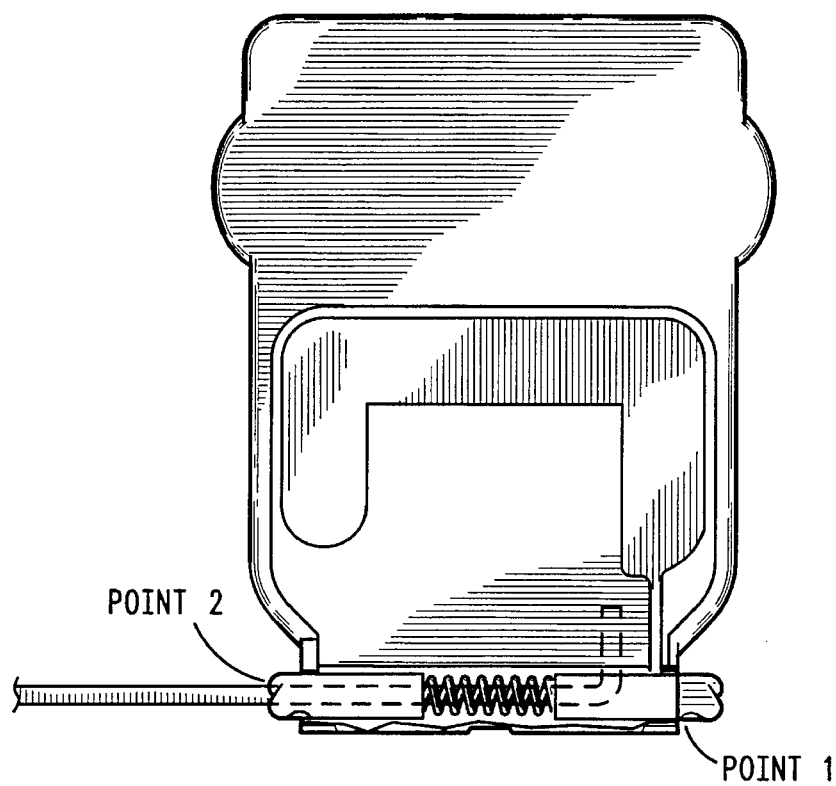
FIG. 6 is a six part illustration of the operation of the flap of the portable radiotelephone in accordance with the present invention.
Figure 6B:
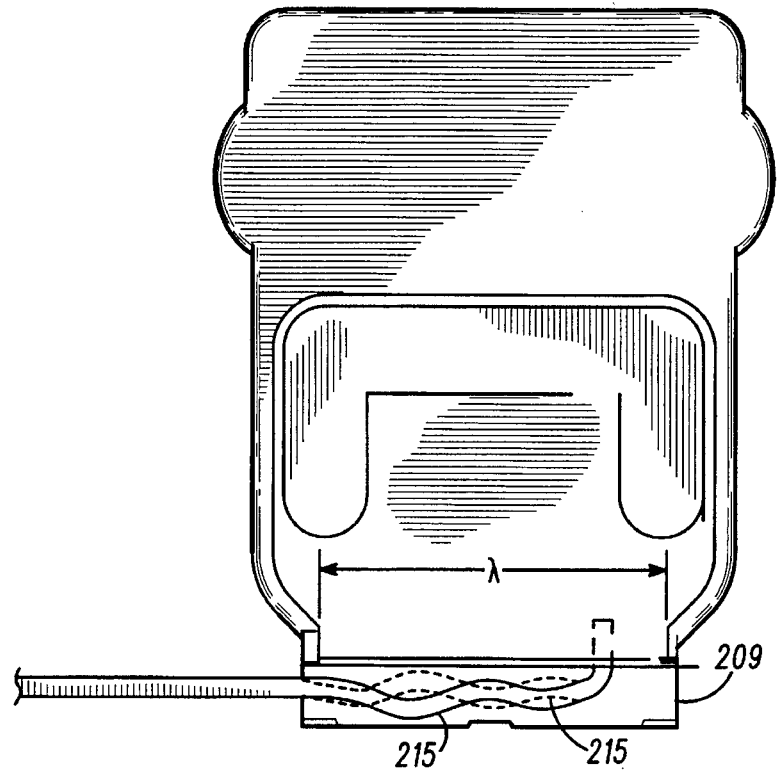

FIG. 6 illustrates the operation of the flap 103 with the radiotelephone 101 of FIG. 1 in its interaction within the flex 215. FIG. 6A indicates points 1 and 2 and the relative positions when the flap is in a closed position. FIG. 6B indicates length L which is equal to 36 millimeters in the preferred embodiment. Additionally, FIG. 6B indicates the torsional twist on the flap 215 as the flip 103 is opened. FIG. 6C is a side view of a portion of radiotelephone 101 with the flap 103 in a closed position. Additionally, Part 3 illustrates the relative positions of point 1 and point 2 with the flip 103 in the closed position. With the flap 103 closed, points 1 and 2 are aligned vertically with each other. FIG. 6D is a side view illustration of a portion of radiotelephone 101 with the flap 103 in an opened position. Additionally, FIG. 6D illustrates the relative positions of points 1 and 2 with the flap 103 in the opened position. As can be seen from the illustration, point 1 is in the same position as it was in the illustration of FIG. 6C. However, point 2 is twisted proportionately with the flap 103 across length L as illustrated in FIG. 6B. FIG. 6E is an illustration of the flap 103 and its interaction on the flex 215 with the flip 103 in the closed position. Notice that the flap 215 runs straight through the flap knuckle 209 without any twists or bends or flexes. FIG. 6F illustrates the flap 103 in an opened position and its interaction on the flex 215 when the flap 103 is in the open position. Notice that the flex 215 here is twisted torsionally within the flap knuckle 209.

In the preferred embodiment, the flex 215 is used to couple an antenna 103 to the transceiver 221 in a portable radiotelephone 101. However, it is anticipated that the flex 215 could be used to couple any type of electric components to each other. Such anticipation includes coupling the electronic devices of a display contained within a hinged movable element to a microprocessor contained within a main housing of an electronic device. Additionally, the anticipation includes coupling a speaker contained within a movable element to a micro-logic device contained within the main housing of an electronic device.

What is claimed is:

1. An electronic device having a housing and a movable element, the movable element movable between at least a first position and a second position, the electronic device comprising:

a hinge for coupling the movable element to the housing, the hinge providing a single axis of rotation and including a knuckle coupled to the moveable element;

a first electronic component disposed in the housing;

a second electronic component disposed within the movable element; and an electronic coupler electrically coupling the first electronic component to the second electronic component, the electronic coupler comprising a flex having a first end and a second end and a body, the first end of the flex coupled to the second electronic component, the body of the flex inserted through the knuckle, and the second end of the flex coupled to the first electronic component, the body of the flex torsionally twisting and untwisting during movement of the movable element to and from the at least first and second positions about the single axis of rotation.

2. An electronic device in accordance with claim 1 wherein the electronic coupler further comprises an electrically conductive elastomeric connector coupling the second end of the flex to the first electronic component.

3. The electronic device of claim 1 wherein the electronic device is a radiotelephone, the first electronic component is a transceiver and the second electronic component is an antenna.

4. The electronic device of claim 1 wherein the hinge further includes at least a first cam and a spring, the body of the flex being disposed within the at least first cam.

5. A method of assembling an electronic device, the electronic device including a housing, a movable element, a first electric component and second electric component, the first electric component disposed in the housing and the second electric component disposed in the movable element, the method comprising the steps of:

inserting at least a first cam and a spring into a hinge knuckle, the knuckle coupled to the movable element;

feeding a first end of a flex into the knuckle, through the at least first cam and the spring, and into the housing;

coupling the first end of the flex to the first electric component; and mating the hinge knuckle to a hinge knuckle receptacle shaped from the housing, the mating is performed in a manner where the movable element is rotatable about a single axis of rotation between at least a first position and a second position with respect to the housing and the body of the flex is torsionally twisted during a rotation of the movable element between the at least first position and the second position.

6. A method of assembling in accordance with claim 5 wherein the step of coupling further comprises providing an electrically conductive elastomeric connector between the first end of the flex and the first electric component.

7. An electronic device having a housing and a movable element, the movable element movable between a first position and a second position, the electronic device comprising:

a hinge for coupling the movable element to the housing, the hinge providing a single axis of rotation and including a knuckle;

a first electronic component disposed in the housing;

a flex having a first end, a body, and a second end, the first end of the flex including a second electronic component disposed thereon, the body of the flex inserted through the knuckle of the hinge, the second end of the flex coupled to the first electronic component, the body of the flex torsionally twisting and untwisting during movement of the movable element between the first and second positions about the single axis of rotation.

8. The electronic device of claim 7 wherein the electronic device is a radiotelephone, the first electronic component is a transceiver, and the second electronic component is an antenna.

9. An electronic device having a housing and a movable element, the moveable element including a knuckle coupled to the moveable element, the knuckle having a hollow portion, a first end, and a side slot, the knuckle coupled to the housing such that the moveable element is movable between a first position and a second position about a single axis of rotation, the electronic device comprising:

a first electronic component disposed in the housing;

a second electronic component disposed in the moveable element; and a flex having a first end, a body, and a second end, the first end of the flex coupled to the second electronic component and inserted through the side slot of the knuckle, the body of the flex disposed within the hollow portion of the knuckle, the second end of the flex coupled to the first electronic component, the body of the flex torsionally twisting and untwisting during movement of the moveable element to and from the first and second positions.

10. The electronic device of claim 9 wherein the second electronic component is disposed on the first end of the flex.

11. The electronic device of claim 9 wherein the first electronic component is a transceiver and the second electronic component is an antenna disposed on the first end of the flex.

12. A portable radiotelephone comprising:

a housing;

a flap further including:
  a knuckle having a hollow portion, a first end, and a side slot;

a first cam and a spring, the first cam having a hollow portion and a side slot, the first cam and spring disposed within the knuckle and coupling the knuckle to the housing such that the flap is movable between a first position and a second position about a single axis of rotation;

a tranceiver disposed in the housing;

an antenna disposed in the flap; and a flex having a first end, a second end, and a body, the second end of the flex coupled to the transceiver, the body of the flex disposed within the hollow portions of the knuckle and the first cam, the first end of the flex inserted through the side slots of the first cam and knuckle and coupled to the antenna, the body of the flex torsionally twisting and untwisting during movement of the flap to and from the first and second positions.

13. The portable radiotelephone of claim 12 wherein the antenna is disposed within the first end of the flex.

* * * * *